United States Patent
Kodaypak et al.

(10) Patent No.: US 10,433,177 B2
(45) Date of Patent: Oct. 1, 2019

(54) ADAPTIVE PAIRING OF A RADIO ACCESS NETWORK SLICE TO A CORE NETWORK SLICE BASED ON DEVICE INFORMATION OR SERVICE INFORMATION

(71) Applicant: AT&T INTELLECTUAL PROPERTY I, L.P., Atlanta, GA (US)

(72) Inventors: Rajendra Prasad Kodaypak, Sammamish, WA (US); Vikram Seenappa, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/829,785

(22) Filed: Dec. 1, 2017

(65) Prior Publication Data
US 2019/0174320 A1    Jun. 6, 2019

(51) Int. Cl.
*H04W 16/02* (2009.01)
*H04W 92/14* (2009.01)
*H04W 72/04* (2009.01)

(52) U.S. Cl.
CPC ......... *H04W 16/02* (2013.01); *H04W 72/048* (2013.01); *H04W 92/14* (2013.01)

(58) Field of Classification Search
CPC ..... H04W 16/00; H04W 16/02; H04W 16/08; H04W 16/16; H04W 16/18; H04W 16/24;
(Continued)

(56) References Cited

U.S. PATENT DOCUMENTS 9,047,218 B2    6/2015  Resch et al.
9,055,486 B2    6/2015  Farhadi
(Continued)

FOREIGN PATENT DOCUMENTS

WO    2017059829 A2    4/2017
WO    2017074486 A1    5/2017
(Continued)

OTHER PUBLICATIONS

Hossain, Ekram, et al., "5G cellular: key enabling technologies and research challenges." IEEE Instrumentation & Measurement Magazine, 2015, 18.3, [https://arxiv.org/pdf/1503.00674.pdf], 23 pages.
(Continued)

*Primary Examiner* — Khawar Iqbal
(74) *Attorney, Agent, or Firm* — Amin, Turocy & Watson, LLP

(57) ABSTRACT

Pairing of a radio access network (RAN) slice to a core network (CN) slice is disclosed. The pairing can be based on RAN slice information, CN slice information, and device information. The device information can enable access to corresponding information from a data store, such as historical pairing correlated to a device, device type, etc. Moreover, other supplemental information, such as service information, can also be employed in determining the pairing. In an aspect, the other supplemental information can enable access to corresponding information form a data store, such as other CN slices comprising an identified virtual network function, historical performance of previously determined pairing(s), etc. A determined pairing can be modified before provisioning or after provisioning based on the RAN slice information, CN slice information, supplemental information, or corresponding information. Further, pairing information can be employed to directly initiate pairing or to cause another device to initiate pairing.

20 Claims, 10 Drawing Sheets

(58) Field of Classification Search
CPC ... H04W 16/32; H04W 28/00; H04W 72/048; H04W 92/14
See application file for complete search history.

(56) References Cited

U.S. PATENT DOCUMENTS

| | | | |
|---|---|---|---|
| 9,063,881 | B2 | 6/2015 | Grube et al. |
| 9,740,730 | B2 | 8/2017 | Volvovski et al. |
| 10,085,199 | B1* | 9/2018 | Shaw ................... H04W 36/36 |
| 2016/0353465 | A1 | 12/2016 | Vrzic et al. |
| 2017/0054595 | A1 | 2/2017 | Zhang et al. |
| 2017/0070892 | A1* | 3/2017 | Song ................... H04L 41/042 |
| 2017/0079059 | A1* | 3/2017 | Li ........................ H04W 16/02 |
| 2017/0141973 | A1 | 5/2017 | Vrzic |
| 2017/0164349 | A1 | 6/2017 | Zhu et al. |
| 2017/0257870 | A1 | 9/2017 | Farmanbar et al. |
| 2018/0041425 | A1* | 2/2018 | Zhang .................... H04L 45/02 |
| 2018/0124854 | A1* | 5/2018 | Myhre ................... H04W 4/70 |
| 2018/0176858 | A1* | 6/2018 | Wang .................... H04W 76/11 |
| 2018/0242304 | A1* | 8/2018 | Rong ................ H04W 28/0247 |
| 2018/0270791 | A1* | 9/2018 | Park ........................ H04W 68/04 |
| 2018/0302877 | A1* | 10/2018 | Bosch .................... H04W 68/02 |
| 2018/0310238 | A1* | 10/2018 | Opsenica ............. H04W 12/06 |
| 2018/0324577 | A1* | 11/2018 | Faccin ................... H04W 8/06 |
| 2018/0359337 | A1* | 12/2018 | Kodaypak .............. H04L 67/18 |
| 2019/0075512 | A1* | 3/2019 | Jin ......................... H04W 28/24 |
| 2019/0098535 | A1* | 3/2019 | Fujishiro ............... H04W 76/27 |

FOREIGN PATENT DOCUMENTS

| | | |
|---|---|---|
| WO | 2017078770 A1 | 5/2017 |
| WO | 2017113109 A1 | 7/2017 |
| WO | 2017118489 A1 | 7/2017 |
| WO | 2017123127 A1 | 7/2017 |
| WO | 2017129230 A1 | 8/2017 |
| WO | 2017135856 A1 | 8/2017 |
| WO | 2017140342 A1 | 8/2017 |
| WO | 2017140356 A1 | 8/2017 |
| WO | 2017140375 A1 | 8/2017 |
| WO | 2017140644 A1 | 8/2017 |
| WO | 2017143047 A1 | 8/2017 |

OTHER PUBLICATIONS

Samdanis, Konstantinos, et al., "From network sharing to multi-tenancy: The 5G network slice broker", IEEE Communications Magazine, 2016, 54.7, [https://arxiv.org/pdf/1605.01201.pdf], 11 pages.

"Network Slicing for 5G networks and service", 5G Americas, [http://www.5gamericas.org files/3214/7975/0104/5G_Americas_Network_Slicing_11.21_Final.pdf], Nov. 2016, 35 pages.

Li, Qian, et al., "An end-to-end network slicing framework for 5G wireless communication systems", arXiv preprint, 2016, arXiv:1608.00572, [https://arxiv.org/pdf/1608.00572.pdf], 13 pages.

Vassilaras, Spyridon, et al., "The Algorithmic Aspects of Network Slicing", IEEE Communications Magazine, 2017, 55.82, [http://gpasxos.pagesperso-orange.fr/doc/J21.pdf], 8 pages.

Rost, Peter, et al., "Network Slicing to Enable Scalability and Flexibility in 5G Mobile Networks", IEEE Communications Magazine, 55.5, arXiv preprint, 2017, [https://arxiv.org/pdf/1704.02129.pdf], 12 pages.

* cited by examiner

ADAPTIVE PAIRING OF A RADIO ACCESS NETWORK SLICE TO A CORE NETWORK SLICE BASED ON DEVICE INFORMATION OR SERVICE INFORMATION

TECHNICAL FIELD

The disclosed subject matter relates to pairing of a radio access network (RAN) slice to a core network (CN) slice, and, more particularly, to enabling adaptive pairing of one or more of the RAN slice or CN slice based on historical information and a context of a device communicating via a RAN-CN slice pair.

BACKGROUND

Next-generation mobility networks including 5G cellular systems are anticipated to enable disruptive digital transformation in the society that will enable people, machines, businesses and governments with unprecedented capabilities to communicate and share information effectively. Beyond the cutting-edge radio access technologies, 5G aims to integrate cross-domain networks so that service providers can offer network-on-demand as a service. With the advances in 5G, new mobility services, convergence of fixed and rich mobile services across several industry verticals and new services-revenue-business models can be enabled. The demands on 5G can be high in terms of handling a variety of use cases associated with mobile-to-mobile and the 'internet of things' (M2M/IoT), augmented/virtual reality (AR/VR), telehealth, targeted mobile advertising, connected cars etc. These new services can require a wide range of aggregate bit rates, low latencies, vehicular speeds, device types and device capabilities, device densities, etc., to provide consistent end user quality for a given service in heterogeneous environment.

DETAILED DESCRIPTION

Figure 1:
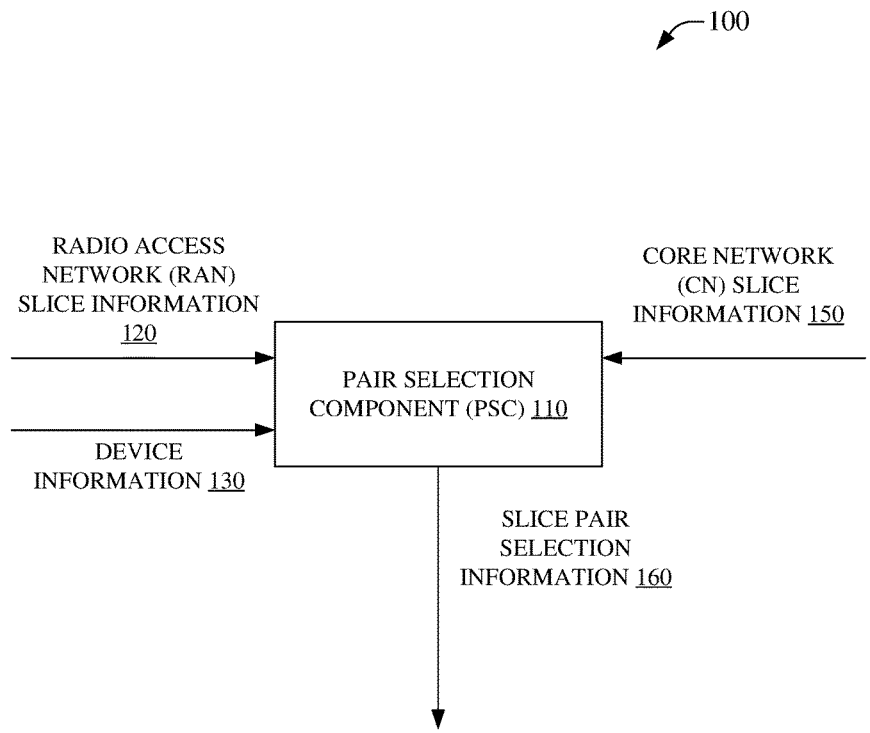
FIG. 1 is an illustration of an example system that can facilitate adaptive pairing of a RAN slice to a CN slice based on device information, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, 5G can be highly resource intensive in terms of handling mobile-to-mobile and the 'internet of things' (M2M/IoT), augmented/virtual reality (AR/VR), telehealth, targeted mobile advertising, connected cars, and other services/technologies. These new services/technologies can require a wide range of aggregate bit rates, low latencies, device types and device capabilities, device densities, etc., to provide consistent end user quality for a given service in a heterogeneous networking environment. Given that a centralized network architecture model with a single set of standard mobility network functions can be extremely complex and expensive to deploy in a manner that can be able to meet the demanding performance requirements for a wide variety of mobility services, network slicing concepts can enable use of standardized network elements and functions in a manner that can be dynamically re-configurable within a network operator architecture to be able to create and deliver a given mobility service. Logically slicing a core network into multiple virtual networks, hereinafter referred to as core network (CN) slice(s), can enable designation of and/or optimization of the CN slice to meet dynamically changing demands on the CN. Moreover, in addition to core network resources, slicing can be equally applicable to a radio access network (RAN) as well. Given the scarce physical radio resources of a RAN, and their allocations and utilizations in space, frequency and time domains, it can be possible to define end-to-end network slicing, wherein one or more CN slice(s) is intelligently paired with one of more RAN slice(s) to adaptively define an end-to-end network-on-demand for services employing differing application(s) and/or service(s), business agreement(s), etc.

Pairing or binding can adaptively couple a RAN slice(s) and a CN slice(s) to provide desired or indicated features, performance, cost, efficiency, etc. In contrast to random pairing between RAN and Core slices, e.g., based on pre-defined static allocations, intelligent pairing can allocate a resource(s) in real time or near real time, and in a manner that can reflect business goals. Lack of an intelligent pairing function for RAN and core slices, and real-time sharing of such information to a network slice coordinator, can impact network functionality as well as targeted mobility applications and services. End-to-end network slicing can be referred to as 'network slicing' and a network slice can comprise both a RAN slice(s) and a CN slice(s), as distinct from CN slicing that does not consider a RAN slice, and as distinct from RAN slicing that does not consider a CN slice.

Network slicing can transform a monolithic mobility networking architecture that has traditionally been used to service smartphones in the current wireless network provider industry. With the proliferation of new wireless technologies and next generation mobile devices, the connectivity and communication models can be expected to rapidly evolve and drive the adoption of new services which were not possible before. Moreover, as network functions transform from physical to virtual domain, e.g., in a cloud centric environment, etc., this transformation can open up innovative opportunities to be able to design fully programmable mobile networks, for example, network that can deliver a 'micro-service architecture', etc. Programmable or adaptive network technology concepts can be applied to core networks and can extended to radio access networks, to provide radio resources and create a robust network slicing concept that can work in a coordinated manner.

Within a single frequency band for a RAN device, each carrier can be split into one or more slice(s) that can be selectable in terms of their utilization in space, time, frequency domain, etc. Each such slice, and combinations of such slices, can be employed within a single carrier-band and/or across multiple carriers for different sets of services, e.g., based on device requirements in a real-time or near real-time manner. Thus, dynamic spectrum management, for example as disclosed herein, can enable spectral allocation via configurable network slices, e.g., pairing of a RAN slice and CN slice, adaptation of a RAN/CN slice pair, etc., in one or more region(s). Spectrum slicing granularity available within a RAN can enable allocation of a fine RAN slice to provide service to applications/services of one or more device across one or more groups of devices, with similar or identical characteristics, for example, narrow band IoT devices that can operate in a 200 kHz channel for infrequent and short data transmission can employ a RAN slice that is narrow and temporally multiplexed to serve the one or more TOT devices, which can also be performed across one or more geographic regions. The example TOT devices can be devices such as, but not limited to, sensors, utility meters that can wake up to report their readings and then return to an extended sleep mode, parking meters that report upon use then return to a sleep mode, etc.

Moreover, the example RAN slice can be re-allocated, for example, as a standalone resource, etc., combined with other radio slices per appropriate rules for aggregation, etc., to satisfy changing service conditions/requirements, e.g., where the RAN slice can be subsequently used to provide service to other devices including mobile broadband smartphones, more spectrum demanding classes of IoT devices, etc. The RAN slice allocation can adapt in real-time, or near real-time, and can maintain a record of historical RAN slice allocation(s), pairing(s), etc., to facilitate future use by the example less demanding IoT devices as they are deployed, though subject to prompt adaptation based on current spectral/performance demands. As such, analysis of information pertaining to the device/service using the spectrum, in addition to analysis of the RAN slice and/or CN slice, can therefore enable intelligent use of historical information to facilitate allocation of a network slice, which can then be adapted based on the demands/performance in the present use of the network slice. In an embodiment, the analysis can be performed based on the historical information and current use prior to allocation of the network slice, e.g., RAN slice-CN slice pair. In an embodiment, the historical information can be employed to select an initial network slice that can then subsequently be adapted based on the current use. Adaptation of a network slice can comprise adaptation of the RAN slice, adaptation of the CN slice, or both. Moreover, the adaptation can be used to update stored historical data. Adaptation of the RAN slice can include changes to the time, frequency, space, etc., of the RAN slice, merging RAN slices, divesting RAN slices, ranking RAN slices, ordering RAN slices, shifting a RAN slice in frequency, time, space, etc., coordinated use with another RAN slice, etc. Adaptation of the CN slice can merge CN slices, divest CN slices, rank CN slices, order CN slices, coordinate use with another CN slice, add/remove functionality to a CN slice, e.g., adding/removing one or more virtual network function (VNF) to a CN slice, etc. Adapting a RAN slice or CN slice can be performed in an automated manner, e.g., in a software deployed network (SDN), via network function virtualization (NFV), etc. As an example, intelligent selection of a network pair can result in offloading non-critical traffic from a RAN slice, CN slice, RAN slice group, CN slice group, etc., to a different RAN or CN slice based on, for example, the priority of the services in a given location, a subscriber agreement parameter, historical use by the device requesting access to a service via the network pair, planned/unplanned maintenance of a RAN device or CN device, changes in use of RAN resources, availability of alternate VNFs, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate adaptive pairing of a radio access network slice and a core network slice based on device information, in accordance with aspects of the subject disclosure. System 100 can comprise pair selection component (PSC) 110. PSC 110 can receive slice information for both radio access network (RAN) slice and a core network (CN) slice, e.g., RAN slice information 120 and CN slice information 150 respectively. In an aspect a RAN can comprise devices enabling an end device located at an edge of a network, e.g., a mobile device, user equipment (UE), IoT sensor, tablet computer, PC, etc., to connect to a network of a wireless network provider. In some embodiments, a RAN can comprise a wired connection, a wireless connection, or both. As an example, a RAN can comprise a NodeB or eNodeB enabling a user equipment (UE) to connect via a wireless link to a network of a wireless network provider. In another example, a RAN can comprise a femtocell, picocell, etc., that can provide a wireless link to the example network. In an aspect, a RAN component can provide one or more RAN technologies, for example, a router can provide a wired link, a WiFi link, e.g., an IEEE 802.xx connection, etc., a Bluetooth® link, a cellular link, etc. These links, portions thereof, combinations thereof, etc., can act as one or more RAN slices.

Generally speaking, a slice can be a virtualization of a physical network that enables independent architecture, partitioning, and organization of computing resources in each slice. This can facilitate flexibility that is typically not readily available in a monolithic embodiment of a physical network. A physical RAN can be sliced in to virtual RAN slices such that the one or more virtual RAN slices can each be adapted according to corresponding characteristics, e.g., adapted to perform a specific type of communication or service better than a generic channel of the monolithic physical RAN. Similarly a CN slice can also be a virtualization of a physical CN resource. Typically a slice, e.g., either a RAN or CN slice, can be considered self-contained with regard to operation, traffic flow, performance, etc., can have its own virtualized architecture and features, and can be individually provisioned in a network. The virtualization of physical network resources via slicing can simplify creation, management, and operation of slices, typically tailored to a type of functionality, environment, service, hardware, etc., to enable efficient consumption of network resources of the physical network. As examples, a first slice can have a first bandwidth and a second slice can have a different second bandwidth; a first slice can have a different latency than a second slice; a first slice can employ different virtual functions, e.g., VNFs, than a second slice; etc. As disclosed herein, selection of a RAN slice and a CN slice can provide benefit to a network by efficiently employing the resources of the end-to-end network, such as by pairing a narrow spectral RAN slice with a CN slice that supports IoT devices via VNFs frequently employed by an IoT device, which can be more efficient than pairing a wide spectral RAN slice with the same CN slice, where this can waste the extra spectrum allocated via the wide spectral RAN slice. Other more nuanced examples are readily appreciated and considered within the scope of the presently disclosed subject matter even where not explicitly recited. As such, RAN slice information 120 can relate to aspects, characteristics, features, bandwidth, jitter, frequency, or nearly any other aspect of a RAN slice, including those not explicitly recited here for the sake of clarity and brevity. Similarly, CN slice information 150 can relate to aspects, characteristics, features, virtualized functions, e.g., VNFs, or nearly any other aspect of a CN slice, including those not explicitly recited here for the sake of clarity and brevity.

PSC 110 can further receive device information 130. Device information 130 can comprise information pertaining to a device that is expected to use, or is requesting provisioning of, a network slice. Device information 130 can comprise a device identifier, device history information, an indication of device type/functionality, an indication of device radio parameters, a subscriber identifier associated with the device, an indication of what version of software is available on the device, etc. In an aspect, the device information can be employed to identify a device, user, subscriber, service, functionality, etc. In another aspect, the device information can also directly or indirectly indicate parameters for a network slice. In a further aspect, the device information can be employed to access corresponding information, e.g., at 630, 730, 830, etc., associated with the device from a source other than the device itself. As an example, device information 130 can be employed to access historical use information stored on a remotely located storage device, e.g., data store 290, 390, etc., access subscriber contract parameters, e.g., via network subscriber information component 392, etc., or other corresponding information that can be employed by PSC 110 in selecting a network slice comprising a selected RAN slice and a selected CN slice. As a rudimentary example, a 'connected thermostat' can report data that is comparatively smaller than might be associated with data from a tablet computer in use and, as such, can typically employ a narrower bandwidth connection than the example tablet computer. Accordingly, the example connected thermostat can be directed to a narrow spectral RAN slice. Moreover, the example thermostat can employ different core network functionality than the example tablet computer, e.g., the tablet might use a billing function in relation to streaming data while the example thermostat might have no need of such core network functionality. Accordingly, the example connected thermostat can be directed to a CN slice having functionality, e.g., VNFs, that are better tailored to the reporting of small bursts of intermittent data and that can avoid allocation of a CN slice that houses other extraneous VNFs, such as a mobile billing VNF. This RAN-CN slice pair can be correlated with the identity of the example connected thermostat, with the type of device of the example connected thermostat, etc., such that where the device later requests a connection via the network of the network provider, the identity of the device can be used to access the previously allocated network slice, e.g., the RAN-CN slice pair previously used, to afford rapid provisioning of the network slice. Similarly, where an example second connected thermostat requests a connection, device information 130 can comprise the device type, which, where it is the same/similar type as the first example connected thermostat, the device type information can be used by PSC 110 to pair the same network slice for the second example connected thermostat as was previously used by the first example connected thermostat. As such, device information 130 can be employed by PSC 110 in determining a network slice.

The selection of a RAN slice and a CN slice by PSC 110 can be based on RAN slice information 120, device information 130, and CN slice information 150. In an embodiment, the device information 130 can be employed to preferentially select a pairing of a RAN slice and a CN slice. However, RAN slice information 120 and/or CN slice information can be employed in the selection, ranking, ordering, etc., of network slices, e.g., RAN-CN slice pairs. In an aspect, alternative RAN or CN slices can be available that may rank higher than a network slice based solely on device information 130. As an example, a newer VNF can be available on a different CN slice than was previously used by the aforementioned example connected thermostat, such that PSC 110 can select the previously employed RAN slice but pair it with the alternate CN slice having the newer VNF. In some embodiments, RAN slice information 120, CN slice information 150, and/or device information 130 can be employed to sort, order, rank, select, etc., a RAN slice, a CN slice, so as to facilitate determining a network slice. As an example, device information 130 can increase/decrease a ranking of a previously used network slice based on frequency of use, performance, user satisfaction, etc., while RAN slice information 120 affect the ranking of a RAN slice based on an indication of the presence of an available RAN slice, current/historical metrics for a RAN slice, etc., while CN slice information 150 can affect the ranking of a CN slice based on indication of the presence of an available CN slice, current/historical metrics for a CN slice, available VNFs, etc. These several information sources can therefore be employed by PSC 110 to adapt the rankings of RAN and CN slices to enable selection of a network slice. In the example, a previously used network slice can be highly ranked, however, where the RAN slice information indicates that the RAN slice is no longer available, an alternate RAN slice can be increased in rank above the previously used RAN slice of the previously used network slice. In the example, a previously used network slice can be highly ranked, however, where the CN slice information indicates that the CN slice is highly burdened by other use, the CN slice ranking can be decremented, which may result in selection of the same network slice despite decrementing the ranking of the CN slice portion, or can result in selection of an alternative CN slice to pair with the previously used RAN slice.

PSC 110 can enable access to slice pair selection information 160. Slice pair selection information 160 can comprise an indication of a RAN slice and a CN slice to pair, e.g., as a network slice. Slice pair selection information 160 can be employed to initiate provisioning of the indicated network slice. Provisioning can be performed by PSC 110 in some embodiments. As an example, PSC 110 can update a NodeB router table such that a first RAN slice directs traffic to a first CN slice, etc. In other embodiments, provisioning can be performed by another device, or other devices, based, at least in part, on slice pair selection information 160. As an example, PSC 110 can send slice pair selection information 160 to another device of a network of a network provider, which other device can initiate provisioning of the RAN slice and the CN slice of the network slice.

In some embodiments, an inference can be formed by PSC 110 based on the several information inputs, e.g., RAN slice information 120, CN slice information 150, device information 130, etc., other supplementary information, corresponding information, etc. This inference can be employed in sorting, ordering, ranking, etc., a RAN slice, a CN slice, or a network slice comprising a RAN slice and a CN slice. As an example, where device information 130 indicates that a first RAN slice is employed in seven of the last ten network access events, and a second RAN slice is used in one most recent network access event and used in two oldest of the ten network access events, an inference can be formed that the highest count RAN slice, e.g., the 7 of 10 uses RAN slice, is the most preferred RAN slice. However, an alternative inference can be determined that the most recently used RAN slice is most preferred, e.g., the 3 of 10 RAN slice. Either of these inferences, or other inferences, can be determined based on machine learning, artificial intelligence systems, programming, rules, etc. As such, PSC 110 can base selection, ranking, ordering, sorting, etc., of slices on the information received and/or on an inference(s) related thereto.

Figure 2:
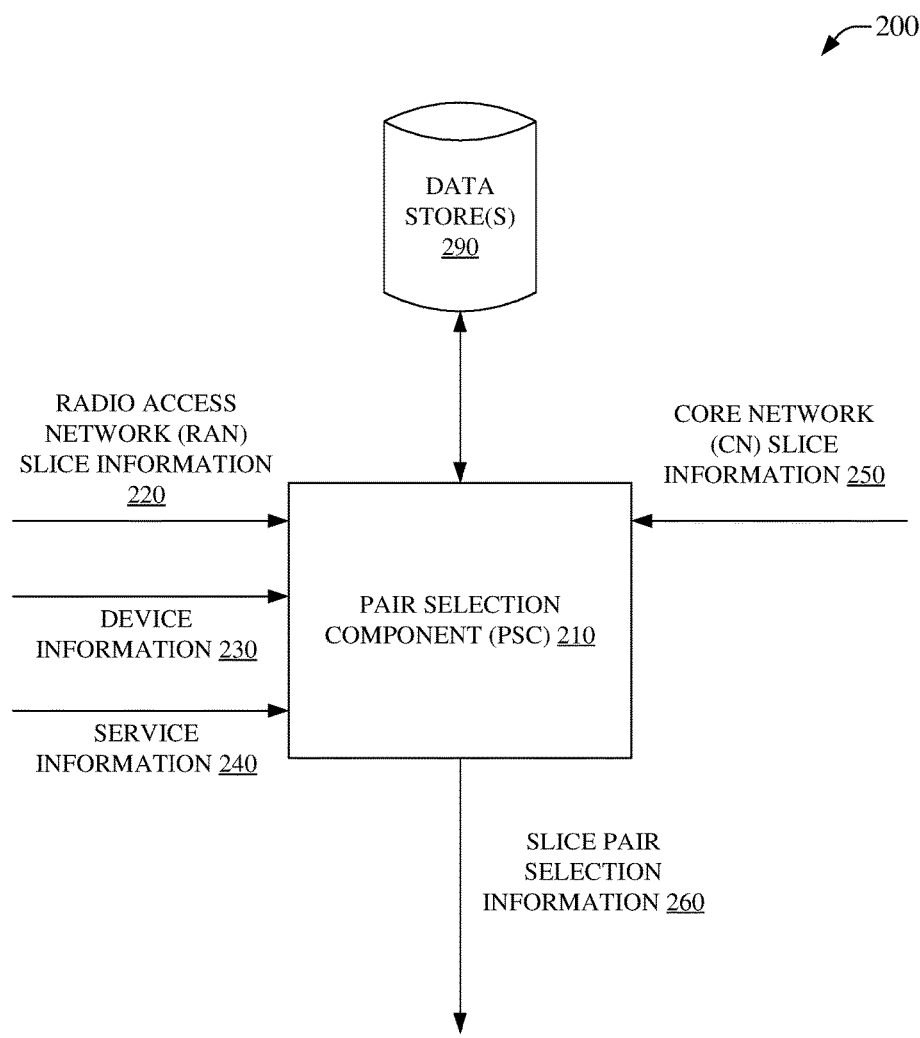
FIG. 2 is an illustration of an example system that can facilitate adaptive pairing of a RAN slice to a CN slice based on at least one of device information and service information, in accordance with aspects of the subject disclosure.

FIG. 2 is an illustration of a system 200, which can enable adaptive pairing of a RAN slice to a CN slice based on at least one of device information and service information, in accordance with aspects of the subject disclosure. System 200 can comprise pair selection component (PSC) 210. PSC 210 can receive RAN slice information 220. PSC 210 can receive CN slice information 250.

PSC 210 can further receive device information 230. Device information can comprise information pertaining to a device that is expected to use, or is requesting provisioning of, a network slice. Device information 230 can comprise a device identifier, device category, device history information, an indication of device type/functionality, an indication of device radio parameters or access capabilities, a subscriber identifier associated with the device, an indication of what version of software is available on the device, etc. In an aspect, the device information can be employed to identify a device, user, subscriber, software, functionality, etc. In another aspect, the device information can also directly or indirectly indicate parameters for a network slice. In a further aspect, the device information can be employed to access corresponding information, for example from data store(s) 290. Corresponding information accessed, e.g., at 630, 730, 830, etc., can be associated with the device but can be received from a source other than the device itself, e.g., data store(s) 290. As an example, a device identifier received via device information 230 can be used to access corresponding historical use information from data store(s) 290 that can be employed by PSC 210 in determining slice pair selection information 260. As such, device information 230 can be employed by PSC 210 in determining a network slice.

PSC 210 can also receive service information 240. Service information 240 can comprise information pertaining to a service or functionality that is expected to be used, e.g., by a device or on behalf of the device. Service information 240 can comprise a service identifier, historical service information, an indication of service type/functionality, a subscriber identifier associated with the service, etc. In an aspect, service information 240 can be employed to identify a service, subscriber to the service, functionality or type of a service, etc. In another aspect, service information 240 can also directly or indirectly indicate parameters for a network slice, e.g., a RAN slice of the network slice should meet bandwidth threshold value, should meet a latency threshold value, should meet a jitter threshold value, should meet geographical rules, etc.; a CN slice of the network slice should have access to, or not have access to, a first VNF, etc. In some embodiments, indirect indication of parameters via service information 240 can be via corresponding information stored on data store(s) 290. In a further aspect, the service information can be employed to access corresponding information, e.g., at 630, 730, 830, etc. As such, service information 240 can be employed by PSC 210 in determining a network slice.

The selection of a RAN slice and a CN slice, e.g., a network slice, by PSC 210 can be based on RAN slice information 220, device information 230, service information 240, and CN slice information 250. In an embodiment, the device information 230 and/or the service information 240 can be employed to preferentially select a pairing of a RAN slice and a CN slice. However, RAN slice information 220 and/or CN slice information can also be employed in the selection, re-selection, ranking, ordering, etc., of network slices, e.g., RAN/CN slice pairs. In an aspect, alternative RAN or CN slices can be available that may rank higher than a network slice based solely on device information 230 and/or service information 240. As an example, device information 230 can be used to highly rank a first network slice comprising a first RAN slice and a first CN slice, however a newer VNF can be available on a second CN slice, such that PSC 210 can select the first RAN slice and second CN slice. However, where service information 240 indicates that the newer VNF is not compatible with a service to be performed, PSC 210 can remove the second CN slice or decrement the ranking of the second CN slice, which can result in the first RAN slice and the first CN slice being selected for the network slice. In some embodiments, RAN slice information 220, CN slice information 250, device information 230, and/or service information 240, can be independently or cooperatively employed to sort, order, rank, select, etc., a RAN slice, a CN slice, and determine a network slice. These several information sources can therefore be employed by PSC 210 to adapt the rankings of RAN and CN slices to enable selection of a network slice, e.g., a highest ranked RAN slice and highest ranked CN slice can be selected as a network slice.

PSC 210 can enable access to slice pair selection information 260. Slice pair selection information 260 can comprise an indication of a RAN slice and a CN slice to pair, e.g., a network slice. Slice pair selection information 260 can be employed to initiate provisioning of the indicated network slice. Provisioning can be performed by PSC 210 in some embodiments. In other embodiments, provisioning can be performed by another device, or other devices, based, at least in part, on slice pair selection information 260.

Figure 3:
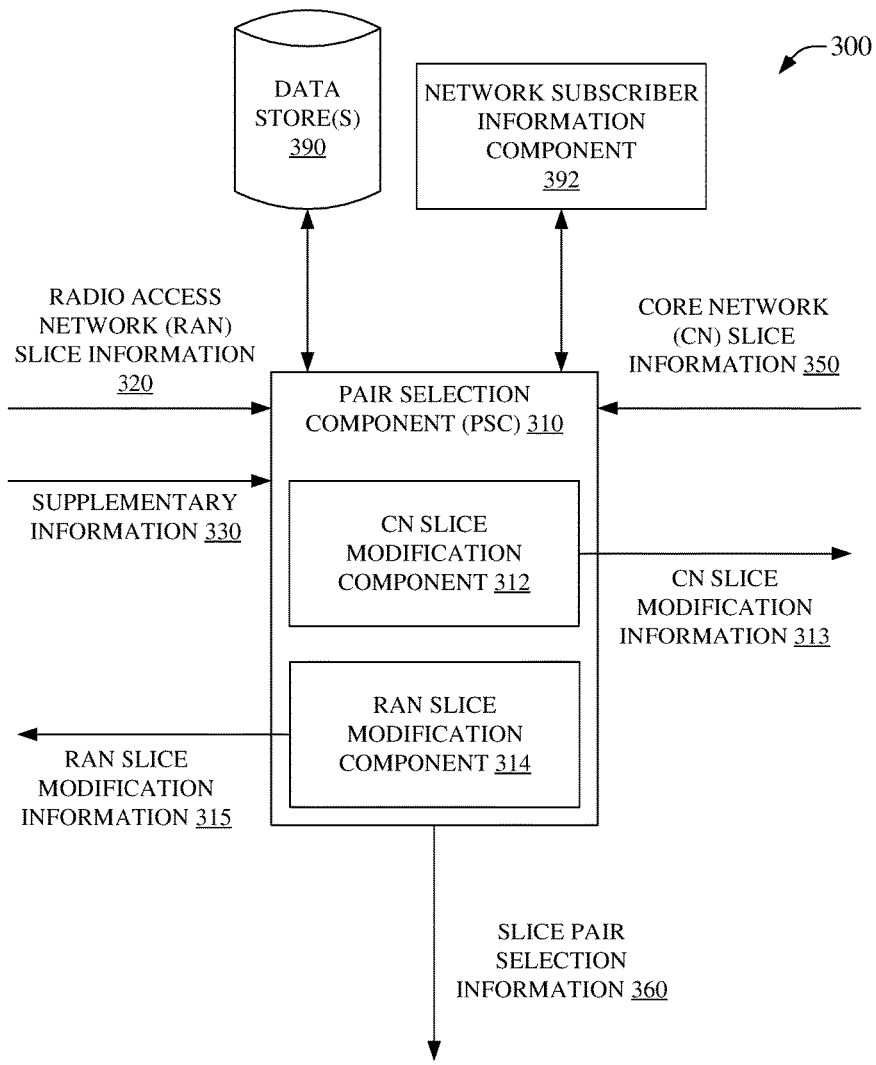
FIG. 3 is an illustration of an example system that can enable adaptive pairing of a RAN slice to a CN slice based on supplementary information and modification of one or more of the RAN slice and CN slice, in accordance with aspects of the subject disclosure.

FIG. 3 is an illustration of a system 300, which can facilitate adaptive pairing of a RAN slice to a CN slice based on supplementary information and modification of one or more of the RAN slice and CN slice, in accordance with aspects of the subject disclosure. System 300 can comprise pair selection component (PSC) 310. PSC 310 can receive RAN slice information 320. PSC 310 can receive CN slice information 350.

PSC 310 can further receive supplementary information 330. Supplementary information 330 can comprise device information, e.g., 130, 230, etc., service information, e.g., 240, etc., or other supplementary information. As such, supplementary information 330 can comprise information pertaining to a device that is expected to use, or is requesting provisioning of, a network slice, a device identifier, device history information, an indication of device type/functionality, an indication of device radio parameters, a subscriber identifier associated with the device, an indication of what version of software is available on the device, etc., a service identifier, historical service information, an indication of service type/functionality, a subscriber identifier associated with the service, etc. In an aspect, the supplementary information 330 can be employed to identify a device, user, subscriber, software, functionality, etc., can be employed to identify a service, subscriber to the service, functionality or type of a service, etc. In another aspect, the supplementary information 330 can also directly or indirectly indicate parameters for a network slice. In a further aspect, supplementary information 330 can be employed to access corresponding information, for example from data store(s) 390, network subscriber information component 392, etc. Corresponding information accessed, e.g., at 630, 730, 830, etc., can be associated with a requesting device and/or service, but can be received from a source other than the requesting device itself, e.g., data store(s) 390. As an example, a device identifier received via supplementary information 330 can be used to access corresponding historical use information from data store(s) 390, and can be used to access subscription plan parameters associated with the device via network subscriber information component 392, that can be employed by PSC 310 in determining slice pair selection information 360. As such, supplementary information 330 can be employed by PSC 310 in determining a network slice.

The selection of a RAN slice and a CN slice, e.g., a network slice, by PSC 310 can be based on RAN slice information 320, supplementary information 330, and CN slice information 350. In an embodiment, the device information 330 and/or the service information 340 can be employed to preferentially select a pairing of a RAN slice and a CN slice. However, RAN slice information 320 and/or CN slice information can also be employed in the selection, ranking, ordering, etc., of network slices, e.g., RAN/CN slice pairs. In an aspect, alternative RAN or CN slices can be available that may rank higher than a network slice based solely on supplementary information 330. As an example, supplementary information 330 can be used to highly rank a first network slice comprising a first RAN slice and a first CN slice, however a newer VNF can be available on a second CN slice, such that PSC 310 can select the first RAN slice and second CN slice. However, where supplementary information 330 also indicates that the newer VNF is not compatible with a service to be performed, PSC 310 can remove the second CN slice or decrement the ranking of the second CN slice, which can result in the first RAN slice and the first CN slice being selected for the network slice. In some embodiments, RAN slice information 320, CN slice information 350, and/or supplementary information 330, can be independently or cooperatively employed to sort, order, rank, select, etc., a RAN slice, a CN slice, and determine a network slice. These several information sources can therefore be employed by PSC 310 to adapt the rankings of RAN and CN slices to enable selection of a network slice, e.g., a highest ranked RAN slice and highest ranked CN slice can be selected as a network slice.

PSC 310 can enable access to slice pair selection information 360. Slice pair selection information 360 can comprise an indication of a RAN slice and a CN slice to pair, e.g., a network slice. Slice pair selection information 360 can be employed to initiate provisioning of the indicated network slice. Provisioning can be performed by PSC 310 in some embodiments. In other embodiments, provisioning can be performed by another device, or other devices, based, at least in part, on slice pair selection information 360.

PSC 310 can enable access to slice modification information. RAN slice modification information 315 can be generated by RAN slice modification component 314 of PSC 310, based on the same or similar information employed by PSC 310 in selecting the network slice. PSC 310 can enable access to RAN slice modification information 315 by other devices, e.g., devices related to management of a RAN slice. RAN slice modification information 315 can comprise information that can be employed to, or can cause, modification of a RAN slice. As an example, a RAN slice can be modified by aggregation/merging with one or more other RAN slices, splitting of a the RAN slice into two or more other RAN slices, shifting of a frequency, time, or space feature of a RAN slice, increasing/decreasing a bandwidth of a RAN slice, etc. As such, PSC 310 can cause, initiate, trigger, etc. As an example, historical use information can indicate that a RAN slice is frequently modified to increase bandwidth periodically at a determined time and, where the network slice request occurs near an instance of that determined time, the RAN slice can be modified to increase the bandwidth to reduce the additional traffic that would otherwise likely be needed to increase the bandwidth if the network slice is provisioned prior to increasing the bandwidth of the RAN slice. In some embodiments, the example modification can be performed/initiated prior to indicating the network pair, e.g., via slice pair selection information 360, e.g., the RAN slice can be modified prior to provisioning. In other embodiments, the example modification can be performed/initiated after indicating the network pair, e.g., the RAN slice can automatically be modified after provisioning.

In some embodiments, PSC 310 can enable access to CN slice modification information 313. CN slice modification information 313 can be generated by CN slice modification component 312 of PSC 310, based on the same or similar information employed by PSC 310 in selecting the network slice. CN slice modification information 313 can comprise information that can be employed to, or can cause, modification of a CN slice. As an example, a CN slice can be modified by aggregation/merging with one or more other CN slices, splitting of a the CN slice into two or more other CN slices, adding/removing/modifying a VNF of a CN slice, etc. As such, PSC 310 can cause, initiate, trigger, etc., modification of a CN slice. As an example, historical use information can indicate that a CN slice is frequently merged with another CN slice to enable access to a VNF. Accordingly, the CN slice can be modified to include the VNF to avoid needing to merge the two CN slices as frequently. In some embodiments, the example modification can be performed/initiated prior to indicating the network pair, e.g., the CN slice can be modified prior to provisioning. In other embodiments, the example modification can be performed/initiated after indicating the network pair, e.g., the CN slice can automatically be modified after provisioning.

Figure 4:
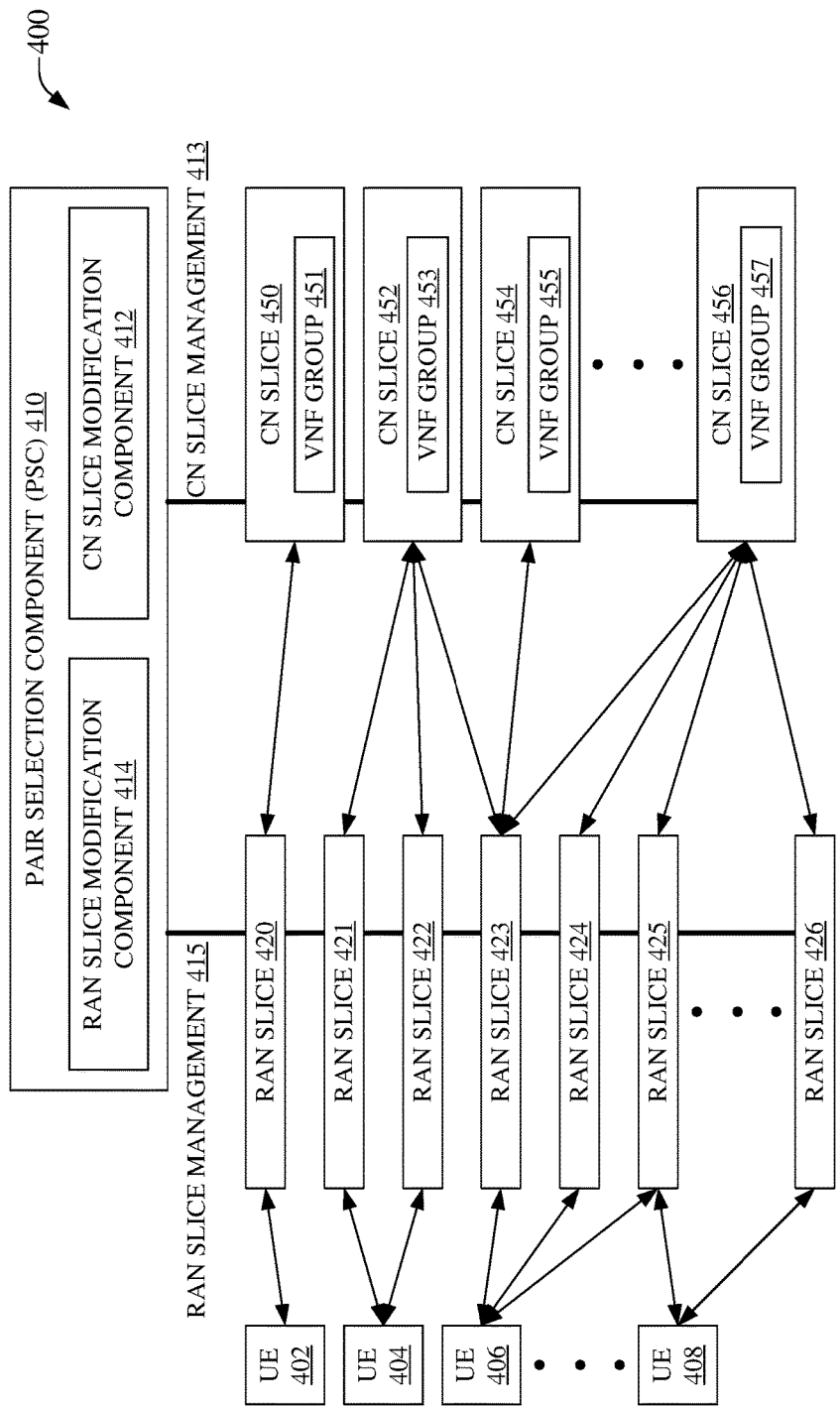
FIG. 4 illustrates an example system that can facilitate an intelligently selected modifiable network slice, in accordance with aspects of the subject disclosure.

FIG. 4 is an illustration of a system 400, which can enable an intelligently selected modifiable network slice, in accordance with aspects of the subject disclosure. System 400 can comprise PSC 410. PSC 410 can receive RAN slice and/or CN slice information, e.g., from RAN slice(s) 410-426, CN slice(s) 450-456, etc., for example, via RAN slice management link(s) 415 and/or CN slice management link(s) 413. PSC 410 can further receive supplementary information that can comprise device information, e.g., 130, 230, etc., service information, e.g., 240, etc., or other supplementary information. As such, supplementary information can comprise information pertaining to a device, e.g., UE 402-408, etc., that is expected to use, or is requesting provisioning of, a network slice, a device identifier, device history information, an indication of device type/functionality, an indication of device radio parameters, a subscriber identifier associated with the device, an indication of what version of software is available on the device, etc., a service identifier, historical service information, an indication of service type/functionality, a subscriber identifier associated with the service, etc. In an aspect, the supplementary information can be employed to identify a device, user, subscriber, software, functionality, etc., can be employed to identify a service, subscriber to the service, functionality or type of a service, etc. In another aspect, the supplementary information can also directly or indirectly indicate parameters for a network slice. In a further aspect, supplementary information can be employed to access corresponding information, for example from data store(s) 290, 390, etc., network subscriber information component 392, etc. Corresponding information accessed, e.g., at 630, 730, 830, etc., can be associated with a requesting device and/or service, but can be received from a source other than the requesting device itself, e.g., data store(s) 290, 390, etc., 392, etc. As such, supplementary information can be employed by PSC 410 in determining, selecting, ranking, ordering, sorting, etc., a network slice comprising a RAN slice(s) 420-426, etc., and a CN slice(s) 450-456, etc.

The selection of a RAN slice(s) 420-426, etc., and a CN slice(s) 450-456, etc., e.g., a network slice, by PSC 410 can be based on RAN slice information, supplementary information, and CN slice information. In an embodiment, the device information and/or the service information can be employed to preferentially select, order, sort, rank, etc., a pairing of a RAN slice(s) 420-426, etc., and a CN slice(s) 450-456, etc. However, RAN slice information and/or CN slice information can also be employed in the selection, ranking, ordering, etc., of network slices, e.g., RAN/CN slice pairs. In an aspect, alternative RAN or CN slices, e.g., from RAN slice(s) 420-426, etc., and a CN slice(s) 450-456, etc., can be available that may rank higher than a network slice selected solely on supplementary information as disclosed herein. In some embodiments, RAN slice information, CN slice information, and/or supplementary information, can be independently or cooperatively employed to sort, order, rank, select, etc., a RAN slice, a CN slice, and determine a network slice. These several information sources can therefore be employed by PSC 410 to modify the rankings, etc., of RAN slice(s) 420-426, etc., and a CN slice(s) 450-456, etc., to enable selection of a network slice.

PSC 410 can enable access to slice pair selection information, for example, via RAN slice management link 415 and/or CN slice management link 413. In another embodiment, slice pair information can be accessed by another device that manages or provisions a RAN or CN slice as part of a network slice. Slice pair selection information can comprise an indication of one or more RAN slice(s) and one or more CN slice(s) to pair into a network slice. Slice pair selection information can be employed to initiate provisioning of the indicated network slice. Provisioning can be performed by PSC 410 in some embodiments. In other embodiments, provisioning can be performed by another device, or other devices, based, at least in part, on slice pair selection information.

As illustrated in FIG. 4, etc., a network slice can comprise one or more RAN slice(s) and one or more CN slice(s). As an example, UE 402 can be provided with network access via a first network slice comprising RAN slice 420 and CN slice 450, as directed by PSC 410 via RAN slice management link 415 and CN slice management link 413, which can provide UE 402 with access to VNF group 451 that can comprise one or more VNFs. The VNFs comprising VNF group 451 can, in some embodiments be relevant to the use of a service corresponding to UE 402, for example, VNF group 451 can comprise a virtual function supporting a mobile billing feature that can be used to enable billing for mobile network access by UE 402. As another example, VNF group 451 can comprise a virtualized data aggregation feature that can be used to enable aggregation of data from UE 402 with other data received from UE 402 or another UE, for example where UE 402 is a sensor of a group of sensors and the data from these sensors is reported via one or more RAN slices to one or more CN slices where that data is aggregated before being send to another device, such as a 3rd party server, etc.

In some embodiments, a network slice can comprise more than one RAN slice and/or more than one CN slice. As an example, UE 404 can employ a selected network slice comprising RAN slices 421 and 422 paired with CN slice 452. CN slice 452 can facilitate access to VNF group 453 that can comprise one or more VNFs. As another example, UE 406 can employ a selected network slice comprising RAN slices 423, 424, and 425 paired with CN slices 452, 454, and 456, e.g., these RAN and CN slices can be merged, e.g., modified, etc., as disclosed herein, into one network slice. CN slices 452, 454, and 456 can facilitate access to VNF groups 453, 455, and 457 that can each comprise one or more VNFs. Alternatively, UE 406 can employ more than one selected network slice, for example, UE 406 can use a first network slice comprising RAN slice 423 paired with CN slices 452, 454, and 456, e.g., these RAN and CN slices can be merged into the first network slice, and UE 406 can also use a second network slice comprising RAN slices 424, and 425 paired with CN slices 454 and 456, e.g., these RAN and CN slices can be merged into the second network slice. CN slices 452, 454, and 456 can facilitate access to VNF groups 453, 455, and 457 that can each comprise one or more VNFs. As a further example, of network slice pairs, UE 408 can employ a first RAN slice comprising RAN slice 425 and CN slice 456, and can employ a second network slice comprising RAN slice 426 and CN slice 456, wherein CN slice 456 can enable access to VNF group 457 that can comprise one or more VNFs. Merging, divesting, creating new RAN, CN, or network slices, removing existing RAN, CN, or network slices, or nearly any other modification or management of RAN slice(s), CN slice(s), or network slices can be based on determinations regarding the pairing of RAN and CN slices by PSC 410 via RAN slice modification component 414 and/or CN slice modification component 412. The determinations relating to modification of an aspect of a network slice can be communicated to RAN slice(s) 420-426, etc., and a CN slice(s) 450-456, etc., via RAN slice management link 415 and/or CN slice management link 413 respectively. It will be noted that one or more of RAN slice(s) 420-426, etc., and a CN slice(s) 450-456, etc., can be located in the same, or different, wireless networks, e.g., RAN slice 426 can be in a different wireless network from RAN slice 420 but can still receive information from PSC 410 via RAN slice management link 415. Also of note, where the networks are different networks, they can be operated by the same, or different, network provider entities, e.g., RAN slice 426 can be operated by a first wireless network entity that is different from a second wireless network entity that can operate RAN slice 420. As will be readily appreciated, many combinations of one or more RAN slice(s) and one or more CN slice(s) can be selected to form one or more network slices, wherein the RAN slice and/or CN slice can be in one or more network(s) operated by one or more network operator entities, and, while all considered within the scope of the present disclosure, not all can be explicitly recited for the sake of clarity and brevity.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
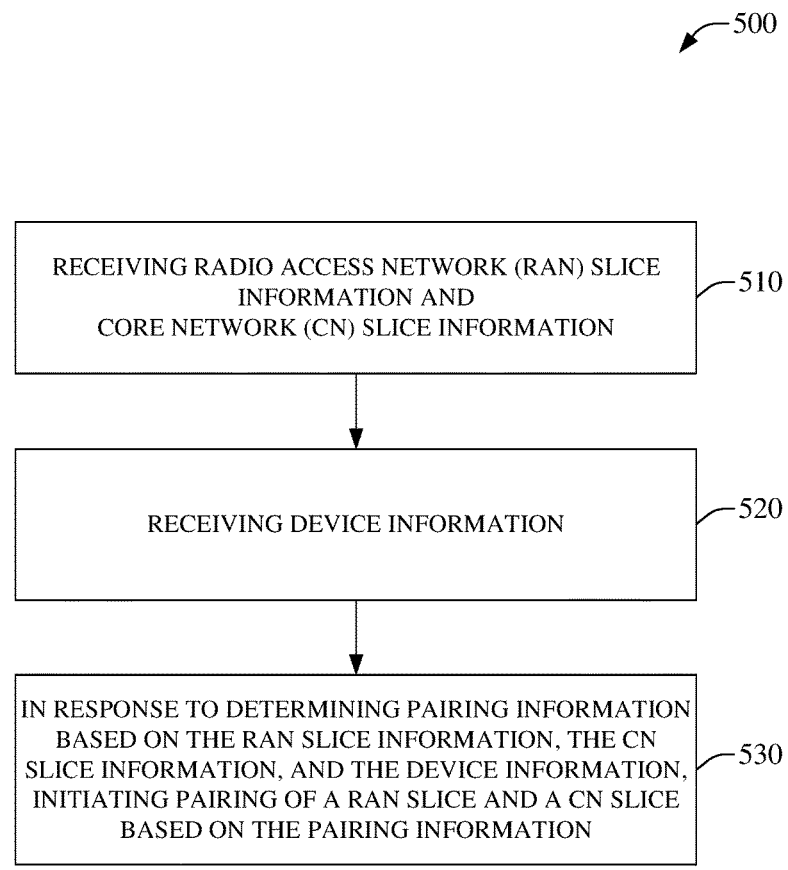
FIG. 5 is an illustration of an example method, facilitating adaptive pairing of a RAN slice to a CN slice based on device information, in accordance with aspects of the subject disclosure.

FIG. 5 is an illustration of an example method 500, which can facilitate adaptive pairing of a RAN slice to a CN slice based on device information, in accordance with aspects of the subject disclosure. At 510, method 500 can comprise receiving radio access network (RAN) slice information and core network (CN) slice information. RAN slice information and CN slice information can respectively comprise information regarding nearly any aspect, characteristic, feature, etc., of a RAN slice or CN slice, including those not explicitly recited herein for the sake of clarity and brevity. RAN slice information and CN slice information can enable matching or pairing of a RAN slice and CN slice that satisfy a ranking, ordering, sorting, selection rule, etc., and thereby facilitate improvement of the communications network by allowing slicing of the end-to-end network, based on virtual networks employing the physical network resources in an adaptable or modifiable manner. As an example, where bandwidth consumption is conserved by selecting a first RAN slice and first CN slice rather than a second RAN slice and the first CN slice, pairing the first RAN and first CN slices can be ranked higher, selected, satisfy a selection rule, etc., that increases the likelihood of that pairing being selected. As another example, where a first CN slice lacks a first functionality but a second CN slice has the first functionality, pairing a first RAN slice and the first CN slice can be ranked lower, be determined to not satisfy a selection rule, etc., that decreases the likelihood of that pairing being selected while pairing the first RAN slice and the second CN slice can be ranked higher, etc., thereby increasing the likelihood of that pairing being selected.

At 520, method 500 can comprise receiving device information. Device information can comprise information pertaining to a device that is expected to use, or is requesting provisioning of, a network slice comprising a RAN slice and a CN slice. Device information can comprise a device identifier, device history information, an indication of device type/functionality, an indication of device radio parameters, a subscriber identifier associated with the device, an indication of what version of software is available on the device, etc. In an aspect, the device information can be employed to identify a device, user, subscriber, service, functionality, etc. In another aspect, the device information can also directly or indirectly indicate parameters relevant to selection of a network slice. In a further aspect, the device information can be employed to access corresponding information, e.g., at 630, 730, 830, etc., associated with the device from a source other than the device itself. As an example, device information can be employed to access historical network slice information stored on a remotely located storage device, e.g., data store 290, 390, etc., access subscriber contract parameters, e.g., via network subscriber information component 392, etc., or other corresponding information that can be employed in selecting a network slice comprising a RAN slice and a CN slice. As an example, a 'connected' parking meter can report data intermittently, e.g., when the parking meter is used, etc. The parking meter can request a network connection and can provide device information, for example identifying the particular parking meter. Accordingly, a network slice that has previously been employed by the identified parking meter can be determined based on the device identifier in the device information, e.g., via data store(s) 290, 390, etc. This previous network slice information can be employed to adjust the ranking, ordering, selection, etc., of the RAN and CN slices comprising the network slice. This can alter the likelihood of selecting the RAN and CN slices for a new connection to the network by the parking meter, e.g., the RAN and CN slices can be more likely to be selected for the new network connection, etc. As such, device information can be employed in determining a network slice.

At 530, method 500 can comprise, initiating pairing of a RAN slice and a CN slice in response to, and based on, determining pairing information based on the RAN slice information, the CN slice information, and the device information. At this point, method 500 can end. Slice pair selection information can comprise an indication of a RAN slice and a CN slice to pair, e.g., a network slice. Slice pair selection information can be employed to initiate provisioning of the indicated network slice. In some embodiments, an inference can be formed based on the several information inputs, e.g., RAN slice information, CN slice information, device information, other supplementary information, corresponding information, etc. This inference can be employed in sorting, ordering, ranking, etc., a RAN slice, a CN slice, or a network slice comprising a RAN slice and a CN slice. Inferences can be formed based on machine learning, artificial intelligence systems, programming, rules, etc. As such, slice pair selection information can be based on an inference.

In some embodiments, provisioning can be performed by a device performing method 500. In other embodiments, provisioning can be performed by another device, or other devices, based, at least in part, on the slice pair selection information. As an example, a first device can determine slice pair selection information, which can be received by another device of a network of a network provider, which other device can initiate provisioning of the RAN slice and/or the CN slice of the network slice. In some embodiments, different devices can provision the RAN slice(s) and the CN slice(s) based on those different devices receiving the slice pair selection information.

Figure 6:
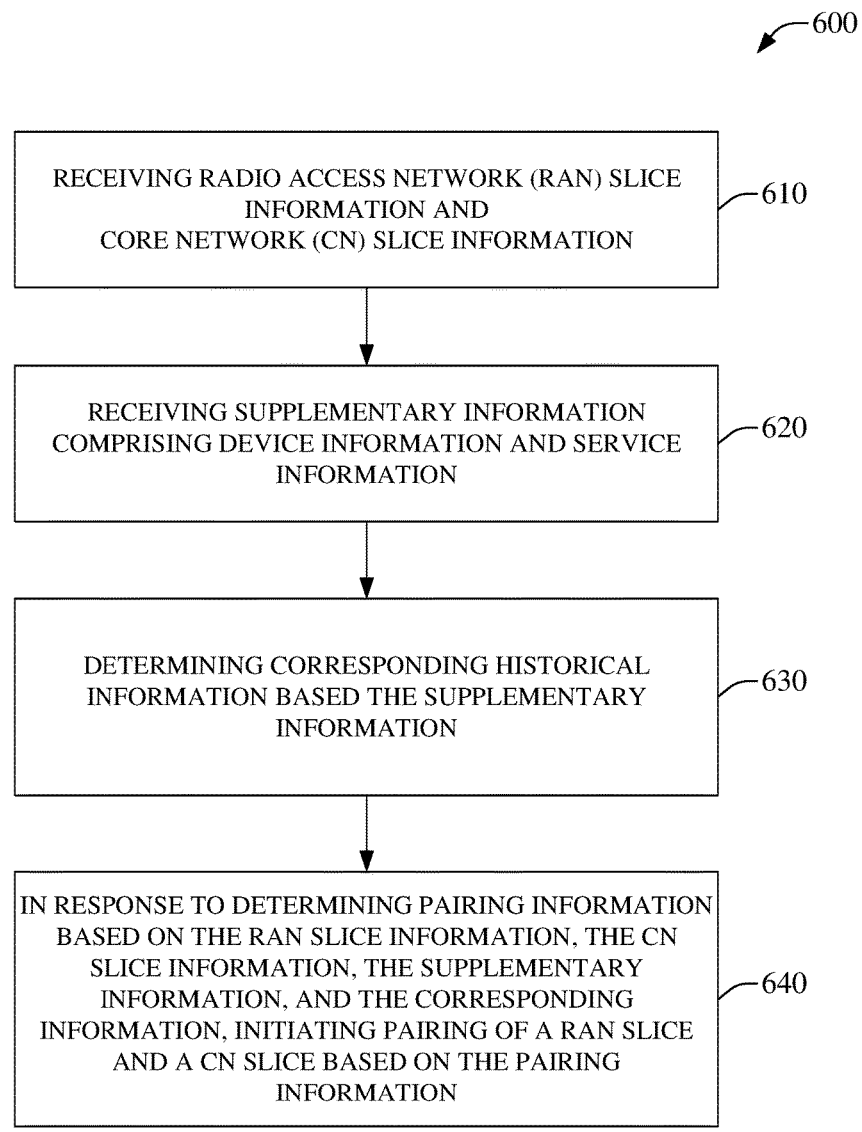
FIG. 6 is an illustration of an example method, enabling adaptive pairing of a RAN slice to a CN slice based on device information, supplementary information, and corresponding historical information, in accordance with aspects of the subject disclosure.

FIG. 6 is an illustration of an example method 600, which can facilitate adaptive pairing of a RAN slice to a CN slice based on device information, supplementary information, and corresponding historical information, in accordance with aspects of the subject disclosure. At 610, method 600 can comprise receiving RAN slice information and CN slice information. RAN slice information and CN slice information can enable matching or pairing of a RAN slice and CN slice that satisfy a ranking, ordering, sorting, selection rule, etc.

At 620, method 600 can comprise receiving supplementary information. Supplementary information can comprise device information and service information. Device information can pertain to a device that is expected to use, or is requesting provisioning of, a network slice. Device information can comprise a device identifier, device history information, an indication of device type/functionality, an indication of device radio parameters, a subscriber identifier associated with the device, an indication of what version of software is available on the device, etc. Service information can comprise information pertaining to a service or functionality that is expected to be used, e.g., by a device or on behalf of the device. Service information can comprise a service identifier, historical service information, an indication of service type/functionality, a subscriber identifier associated with the service, etc. In an aspect, service information can be employed to identify a service, subscriber to the service, functionality or type of a service, etc. In another aspect, service information can also directly or indirectly indicate parameters for a network slice, e.g., a RAN slice of the network slice should meet bandwidth threshold value, should meet a latency threshold value, should meet a jitter threshold value, should meet geographical rules, etc.; a CN slice of the network slice should have access to, or not have access to, a first VNF, etc. In some embodiments, indirect indication of parameters via either device information or service information can be via corresponding information stored on data store(s) 290. As such, supplementary information can be employed in determining a network slice.

In a further aspect, at 630, method 600 can comprise determining corresponding information based on the supplementary information. Corresponding information can be associated with a requesting device and/or service, but can be received from a source other than the requesting device itself, e.g., data store(s) 290, 390, network subscriber information component 392, etc. As an example, a device identifier received via supplementary information can be used to access corresponding historical use information, subscription plan parameters associated with the device, historical mapping of RAN slice(s) and CN slice(s), etc., which corresponding information can be employed in determining slice pair selection information. As such, corresponding information can be employed in determining a network slice.

At 640, method 600 can comprise, initiating pairing of a RAN slice and a CN slice in response to, and based on, determining slice pair selection information based on the RAN slice information, the CN slice information, the supplementary information, and/or the corresponding information. At this point, method 600 can end. Slice pair selection information can comprise an indication of a RAN slice and a CN slice to pair, e.g., a network slice. Slice pair selection information can be employed to initiate provisioning of the indicated network slice. In some embodiments, an inference can be formed based on the several information inputs, e.g., RAN slice information, CN slice information, device information, other supplementary information, corresponding information, etc. This inference can be employed in sorting, ordering, ranking, etc., a RAN slice, a CN slice, or a network slice comprising a RAN slice and a CN slice. Inferences can be formed based on machine learning, artificial intelligence systems, programming, rules, etc. As such, slice pair selection information can be based on an inference.

In some embodiments, provisioning can be performed by a device performing method 600. In other embodiments, provisioning can be performed by another device, or other devices, based, at least in part, on the slice pair selection information. As an example, a first device can determine slice pair selection information, which can be received by another device of a network of a network provider, which other device can initiate provisioning of the RAN slice and/or the CN slice of the network slice. In some embodiments, different devices can provision the RAN slice(s) and the CN slice(s) based on those different devices receiving the slice pair selection information.

Figure 7:
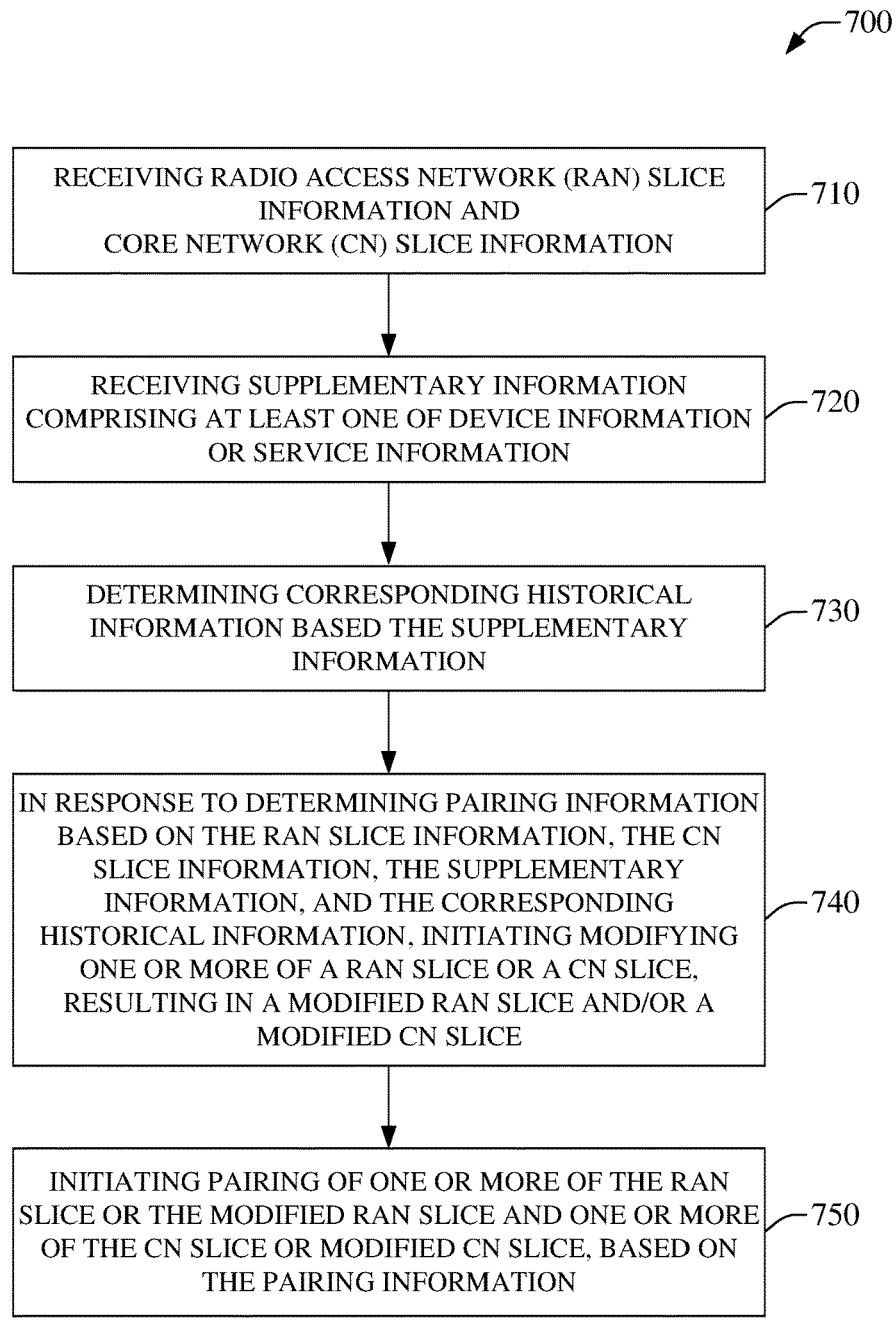
FIG. 7 illustrates an example method, facilitating modification of one or more of a RAN slice and a CN slice, and adaptive pairing of the RAN slice to the CN slice, based on supplementary information and corresponding historical information, in accordance with aspects of the subject disclosure.

FIG. 7 illustrates example method 700 that facilitates modification of one or more of a RAN slice and a CN slice, and adaptive pairing of the RAN slice to the CN slice, based on supplementary information and corresponding historical information, in accordance with aspects of the subject disclosure. Method 700, at 710, can comprise receiving RAN slice information and CN slice information. RAN slice information and CN slice information can enable matching or pairing of a RAN slice and CN slice that satisfy a ranking, ordering, sorting, selection rule, etc.

At 720, method 700 can comprise receiving supplementary information. Supplementary information can comprise device information and service information. Device information can pertain to a device that is expected to use, or is requesting provisioning of, a network slice. Service information can comprise information pertaining to a service or functionality that is expected to be used, e.g., by a device or on behalf of the device. As such, supplementary information can be employed in determining a network slice.

At 730, method 700 can comprise determining corresponding information based on the supplementary information. Corresponding information can be associated with a requesting device and/or service, but can be received from a source other than the requesting device itself, e.g., data store(s) 290, 390, network subscriber information component 392, etc. As an example, a service identifier received via supplementary information can be used to access corresponding service performance information, which corresponding information can be employed in determining slice pair selection information, e.g., selecting a CN slice that has historically performed better with an identified service based on the example corresponding service performance information. As such, corresponding information can be employed in determining a network slice.

Method 700, at 740, can comprise initiating modification of one or more of a RAN slice or a CN slice, resulting in a modified RAN slice and/or a modified CN slice. The initiating the modification can be in response to determining pairing information based on the RAN slice information, the CN slice information, the supplementary information, and the corresponding information.

At 750, method 700 can comprise, initiating pairing of a RAN slice and a CN slice based on the pairing information. In an aspect, the pairing can be of a RAN slice and a CN slice. In another aspect, the pairing can be of a RAN slice and a modified CN slice. In a further aspect, the pairing can be of a modified RAN slice and a CN slice. In a still further aspect, the pairing can be of a modified RAN slice and a modified CN slice. Moreover, where the pairing comprises pairing multiple RAN slices and/or multiple CN slices, the pairing can comprise a modified or unmodified RAN slice and a modified or unmodified CN slice. At this point, method 700 can end.

Figure 8:
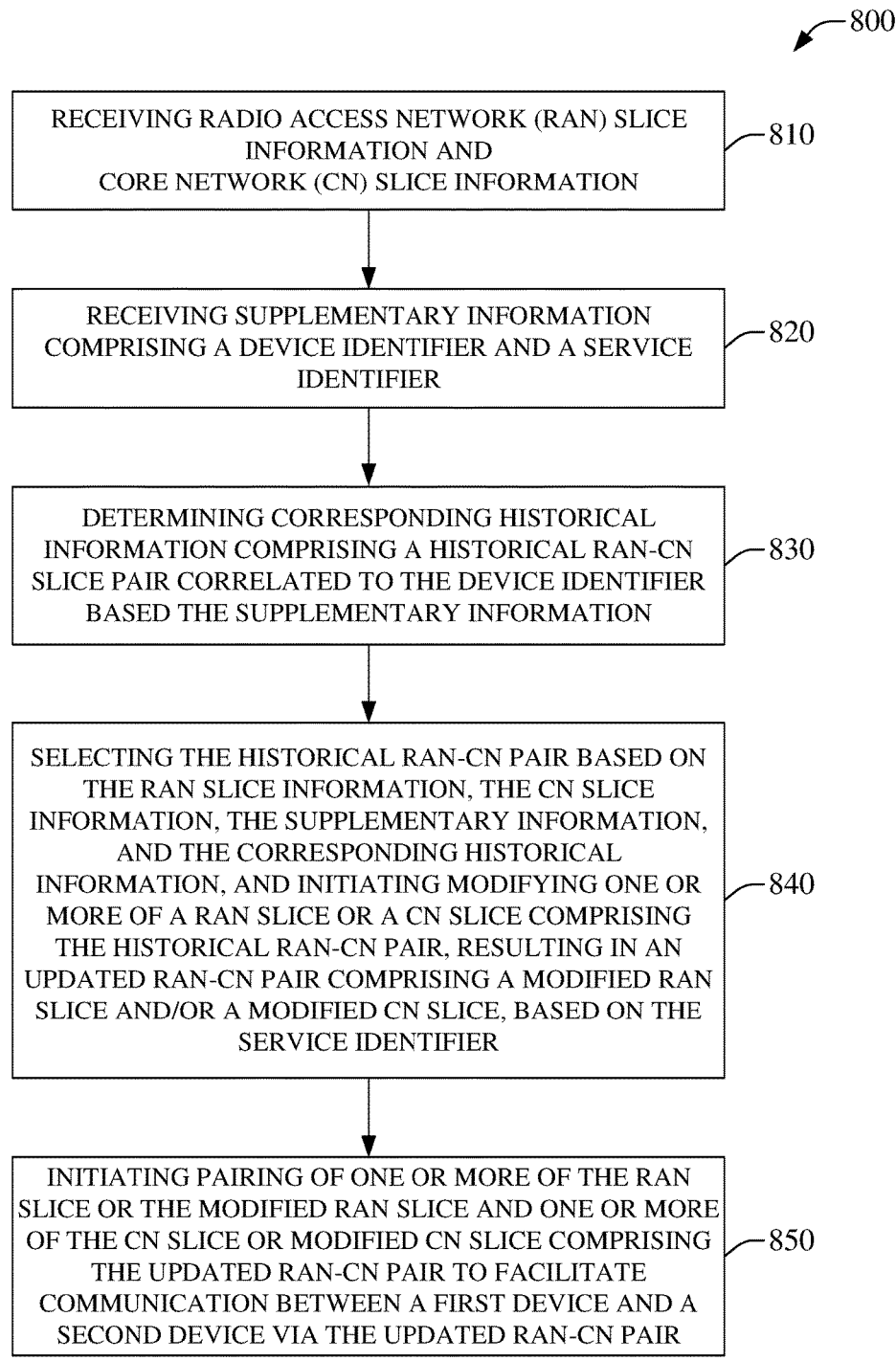
FIG. 8 illustrates an example method, enabling adaptive pairing of a RAN slice to a CN slice based on historical pairing information determined from supplementary information and modification of one or more of the RAN slice and CN slice based on a service to be used, in accordance with aspects of the subject disclosure.

FIG. 8 illustrates example method 800 enabling adaptive pairing of a RAN slice to a CN slice based on historical pairing information determined from supplementary information and modification of one or more of the RAN slice and CN slice based on a service to be used, in accordance with aspects of the subject disclosure. Method 800, at 810, can comprise receiving RAN slice information and CN slice information. RAN slice information and CN slice information can enable matching or pairing of a RAN slice and CN slice that satisfy a ranking, ordering, sorting, selection rule, etc.

At 820, method 800 can comprise receiving supplementary information. Supplementary information can comprise a device identifier and a service identifier. The device identifier can pertain to a device that is expected to use, or is requesting provisioning of, a network slice. The service identifier can comprise information pertaining to a service or functionality that is expected to be used, e.g., by a device or on behalf of the device. As such, supplementary information can be employed in determining a network slice.

At 830, method 800 can comprise determining corresponding historical information based on the supplementary information. The corresponding historical information can comprise information related to a historical RAN-CN slice pair. The information related to the historical RAN-CN slice pair can be correlated to the device identifier from the supplementary information at 820. The corresponding historical data can be received from a source other than the requesting device itself, e.g., data store(s) 290, 390, etc. As an example, the information related to a historical RAN-CN slice pair can indicate previously used network slice and key performance indicators therefore. This corresponding historical information can be employed in determining a network slice.

Method 800, at 840, can comprise selecting the historical RAN-CN pair based on the RAN slice information, the CN slice information, the supplementary information, and the corresponding historical information. Method 800, at 840, further can comprise initiating, based on the service identifier, modifying of one or more of a RAN slice or a CN slice, resulting in a modified RAN slice and/or a modified CN slice comprised in an updated RAN-CN pair. The initiating the modification can be in response to the selecting the historical RAN-CN pair and can result in the updated RAN-CN pair comprising a modified RAN slice and/or a modified CN slice.

At 850, method 800 can comprise, initiating pairing of one or more of the RAN slice or the modified RAN slice, and one or more of the CN slice or the modified CN slice, based on the pairing information. At this point, method 800 can end. The updated RAN-CN pair can facilitate communication between a first device and a second device via the updated RAN-CN pair.

Figure 9:
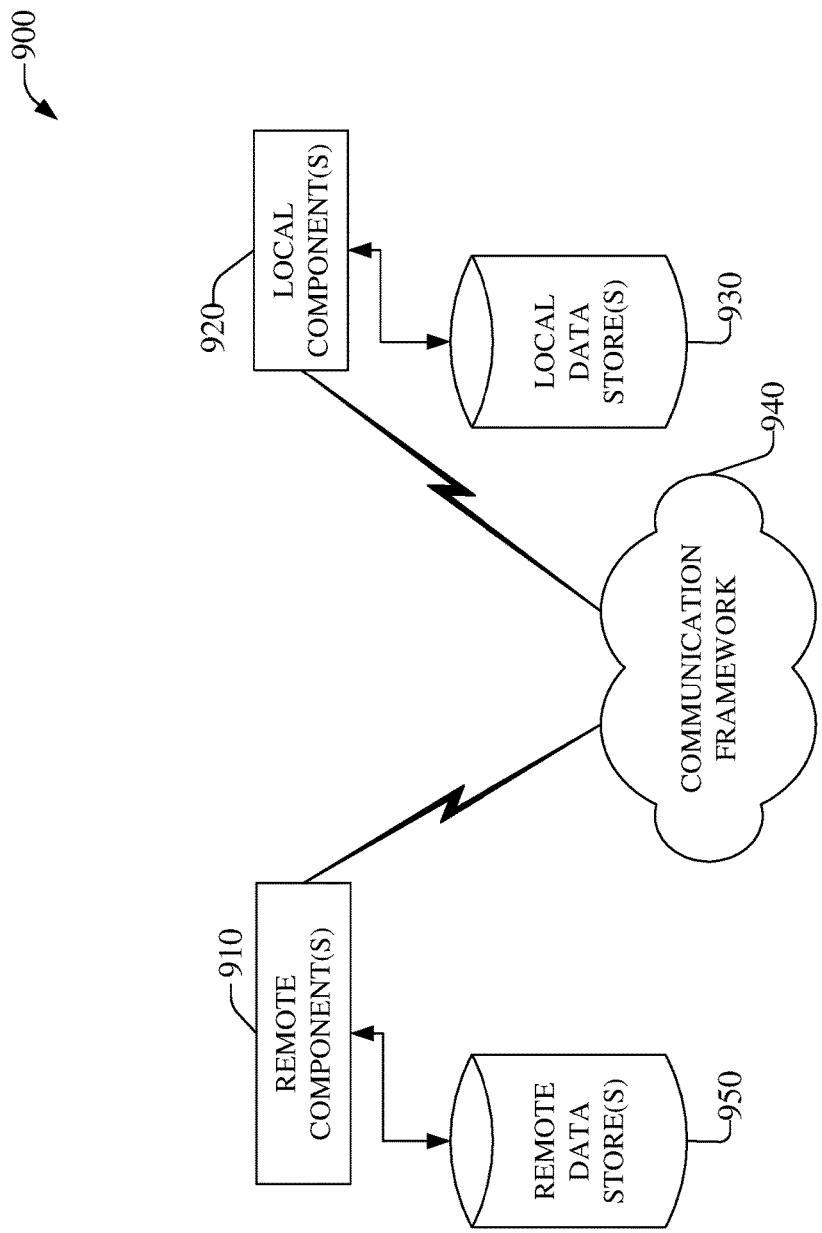
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise RAN slice(s) 420-426, etc., CN slice(s) 450-456, etc., data store(s) 290, 390, etc., e.g., as remote data store(s) 950, network subscriber information component 392, etc., e.g., as remote data store(s) 950, UEs 402-408, etc., or any other device that is located remotely from a PSC, e.g., PSC 110-410, etc.

The system 900 also comprises one or more local component(s) 920. The local component(s) 920 can be hardware and/or software (e.g., threads, processes, computing devices). In some embodiments, local component(s) 920 can comprise PSC 110, 410, etc., CN slice modification component 312, 412, etc., RAN slice modification component 314, 414, etc., data store(s) 290, 390, etc., where local to a PSC, e.g., as local data store(s) 930, network subscriber information component 392, etc., where located local to a PSC, etc., e.g., as local data store(s) 930.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, correlations between supplementary data 330, etc., e.g., device information 130-230, etc., service information 240, etc., or other supplementary data, and corresponding information, e.g., as at 630, 730, 830, etc., can be stored on remote data storage device 290, 390, etc., network subscriber information component 392, etc., on local data storage device(s) 930, etc., that can be coupled to a PSC 110-410, etc.

Figure 10:
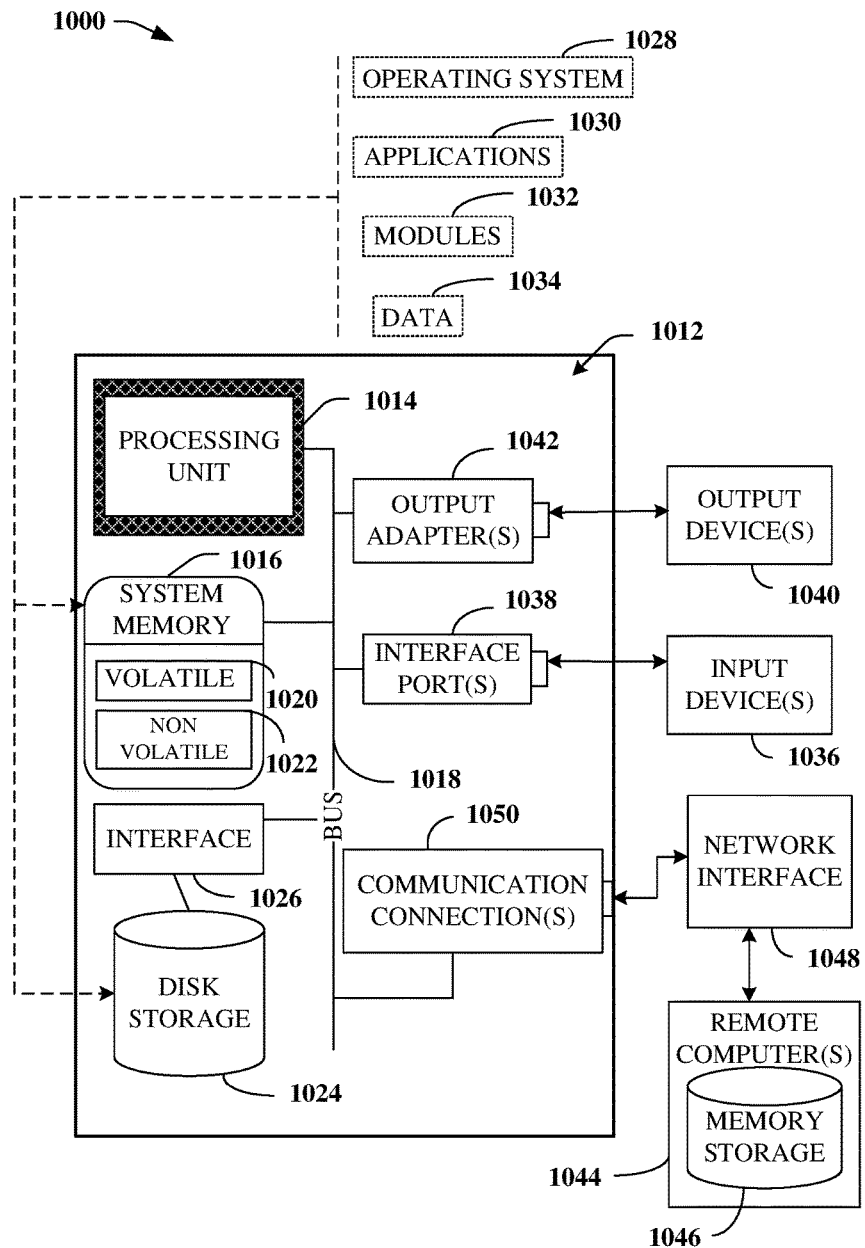
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in PSC 110-410, etc., UE 402-408, etc., CN slice modification component 312, 412, etc., RAN slice modification component 314, 414, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising receiving, by PSC 110, 210, 310, 410, etc., RAN slice information, CN sliced information, device information, and/or other supplementary or corresponding information, and can determine a network slice comprising one or more RAN slice(s) and one or more CN slice(s), that facilitates improved network operation by adapting network physical resources into intelligently paired virtualized resources that can be dynamically adapted to meet current operating goals.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed.

While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
  a processor; and
  a memory that stores executable instructions that, when executed by the processor, facilitate performance of operations, comprising:
    determining first information corresponding to core network slices for a core network environment, wherein the first information corresponding to the core network slices comprises a first characteristic of a first core network slice of the core network slices;
    determining second information corresponding to radio access network slices for a mobility network environment, wherein the second information corresponding to the radio access network slices comprises a second characteristic of a first radio access network slice of the radio access network slices;
    determining a first pairing of the first core network slice and the first radio access network slice based on the first characteristic, the second characteristic, and first end device information for a first end device;
    determining a second pairing of a second core network slice of the core network slices and a second radio access network slice of the radio access network slices based on a third characteristic of the second core network slice and a fourth characteristic of the second radio access network slice;
    ranking the first pairing and the second pairing based on a first key performance indicator of the first pairing and a second key performance indicator of the second pairing;

selecting a pairing from a paired slices group comprising the first pairing and the second pairing, resulting in a selected pairing; and initiating a communicative coupling according to the selected pairing to facilitate communication via the first pairing between the first end device and a second end device.

2. The device of claim 1, wherein a first rank of the first pairing to facilitate communication between the first end device and the second end device is a different rank than a second rank of the second pairing to facilitate communication between the first end device and the second end device.

3. The device of claim 2, wherein:
the second characteristic embodies a first space domain utilization value,
the fourth characteristic embodies a second space domain utilization value, and
the first space domain utilization value is different from the second space domain utilization value.

4. The device of claim 3, wherein the first space domain utilization value being different from the second space domain utilization value results in the first key performance indicator being different from the second key performance indicator.

5. The device of claim 3, wherein the first space domain utilization value being different from the second space domain utilization value results in the first key performance indicator being a same indicator as the second key performance indicator.

6. The device of claim 2, wherein:
the second characteristic embodies a first time domain utilization value,
the fourth characteristic embodies a second space time utilization value, and
the first time domain utilization value is different from the second time domain utilization value.

7. The device of claim 2, wherein:
the second characteristic embodies a frequency space domain utilization value,
the fourth characteristic embodies a second frequency domain utilization value, and
the first frequency domain utilization value is different from the second frequency domain utilization value.

8. The device of claim 1, wherein the initiating the communicative coupling according to the selected pairing results in an increased utilization of network resources in comparison to the selected pairing being a third pairing of the first core network slice and a second radio access network slice.

9. The device of claim 1, wherein the initiating the communicative coupling according to the selected pairing results in an increased utilization of network resources in comparison to the selected pairing being a third pairing of a second core network slice and a first radio access network slice.

10. The device of claim 1, wherein the operations further comprise,
in response to the determining the first pairing of the first core network slice and the first radio access network slice, storing first pairing information relating to the first pairing for the first end device resulting in stored first pairing information; and
in response to a subsequent request from the first end device for access to a subsequent communicative coupling, receiving the stored first pairing information to facilitate reuse of the first pairing.

11. The device of claim 1, wherein the operations further comprise,
in response to the determining the first pairing of the first core network slice and the first radio access network slice, storing first pairing information relating to the first pairing for the first end device resulting in stored first pairing information; and
in response to a subsequent request from the second end device for access to a subsequent communicative coupling, receiving the stored first pairing information to facilitate reuse of the first pairing.

12. The device of claim 1, wherein the first end device is selected from a first end devices group comprising a first user equipment, a sensor device, and an internet-of-things device, and wherein the second end device is selected from a second end devices group comprising a core-network device, a service provider device, a server, and a second user equipment.

13. A method, comprising:
receiving, by a system comprising a processor and a memory, first information corresponding to core network slices;
receiving, by the system, second information corresponding to radio access network slices;
receiving, by the system, first end device information corresponding to a first end device requesting provisioning of a communication pathway to a second end device;
based on a first portion of the first information, a second portion of the second information, and the first end device information, determining, by the system, a first pairing of a first core network slice of the core network slices and a first radio access network slice of the radio access network slices;
based on a third portion of the first information, a fourth portion of the second information, and the first end device information, determining, by the system, a second pairing of a second core network slice of the core network slices and a second radio access network slice of the radio access network slices;
selecting, by the system, a preferred pairing from paired slices comprising the first pairing and the second pairing based on a rank of each paired slice of the paired slices; and
enabling, by the system, access to information corresponding to the preferred pairing to facilitate provisioning of the preferred pairing, wherein the communication pathway is configured to comprise the preferred pairing.

14. The method of claim 13, wherein the first core network slice comprises a first virtual network function that is different from a second virtual network function that is comprised in the second core network slice, wherein the first virtual network function is employable by at least one end device of an end device group via the communication pathway comprising the first pairing, and wherein the end device group comprises the first end device and the second end device.

15. The method of claim 13, wherein the rank of the preferred pairing is based on a historical use of the preferred pairing.

16. The method of claim 15, wherein the historical use of the preferred pairing is correlated to a first end device identifier comprised in the first end device information.

17. A non-transitory machine-readable storage medium, comprising executable instructions that, when executed by a processor, facilitate performance of operations, comprising:

receiving first information corresponding to core network slices;

receiving second information corresponding to radio access network slices;

receiving first end device information corresponding to a first end device requesting provisioning of a communication pathway to a second end device;

receiving first service information corresponding to a service to be performed by the first end device;

determining a first pairing of the first core network slice and a first radio access network slice based on a first portion of the first information, a second portion of the second information, the first end device information, and the first service information;

determining a second pairing of the second core network slice and the second radio access network slice based on a third portion of the first information, a fourth portion of the second information, the first end device information and the first service information;

determining a selected pairing from paired slices comprising the first pairing and the second pairing based on a rank of each paired slice of the paired slices; and enabling access to information corresponding to the selected pairing to facilitate provisioning of the selected pairing, wherein the communication pathway is configured to comprise the selected pairing.

18. The non-transitory machine-readable storage medium of claim 17, wherein the enabling the access comprises:

enabling access to a first virtual network function of the first core network slice to facilitate performance of the service by the first end device.

19. The non-transitory machine-readable storage medium of claim 17, wherein the operations further comprise:

initiating modification of the first core network slice, based on the selected service information, to modify the selected core network slice to comprise a first virtual network function correlated with performing the service, and wherein the enabling the access comprises enabling the access to the first virtual network function of the first core network slice to facilitate performance of the service by the first end device.

20. The non-transitory machine-readable storage medium of claim 17, wherein the first core network slice comprises a first virtual network function that is different from a second virtual network function that is comprised in the second core network slice, wherein the second virtual network function is enabled for the first end device via the communication pathway, wherein the communication pathway comprises a third pairing between the second core network slice and the first radio access network slice, wherein the enabling the access to information comprises enabling the access to the information corresponding to the third pairing to facilitate provisioning of the third pairing, and wherein the communication pathway employs the third pairing to enable the first end device to access the second virtual network function of the second core network slice to facilitate performing the service.

* * * * *